Oct. 26, 1965  W. F. HACKETHAL ETAL  3,214,669
OVERLOAD SHUT-OFF DEVICE
Filed March 20, 1962  2 Sheets-Sheet 1
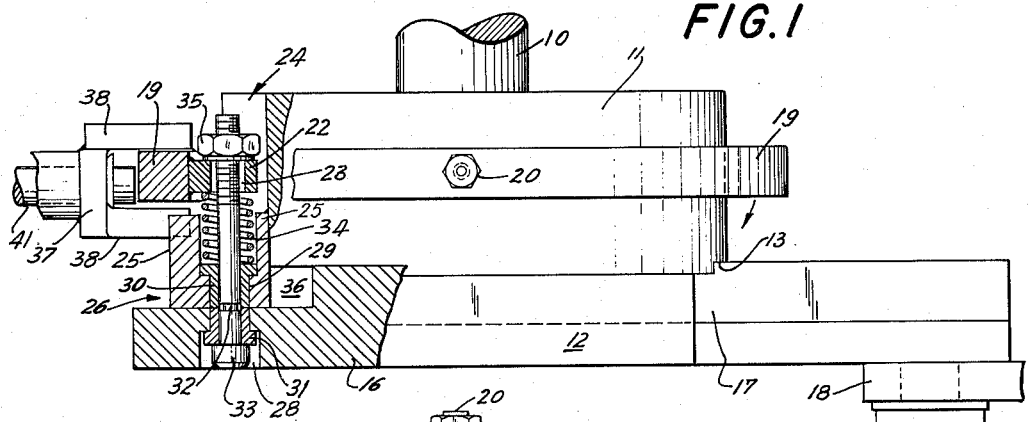
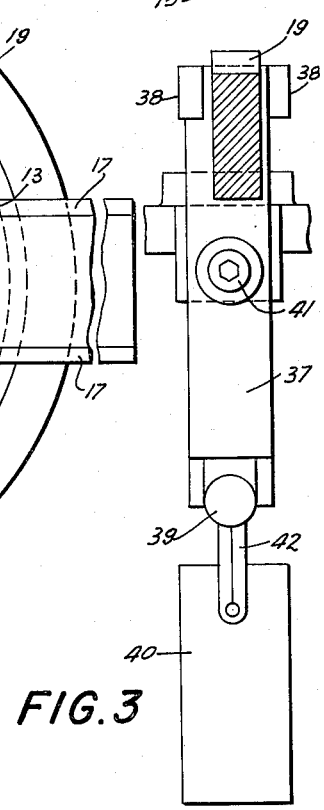
INVENTORS.
EMIL UMBRICHT
WALDEMAR F. HACKETHAL
BY
Curtis, Morris & Safford
ATTORNEYS Oct. 26, 1965    W. F. HACKETHAL ETAL    3,214,669
OVERLOAD SHUT-OFF DEVICE
Filed March 20, 1962    2 Sheets-Sheet 2
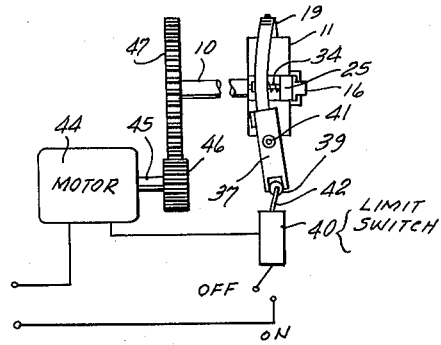
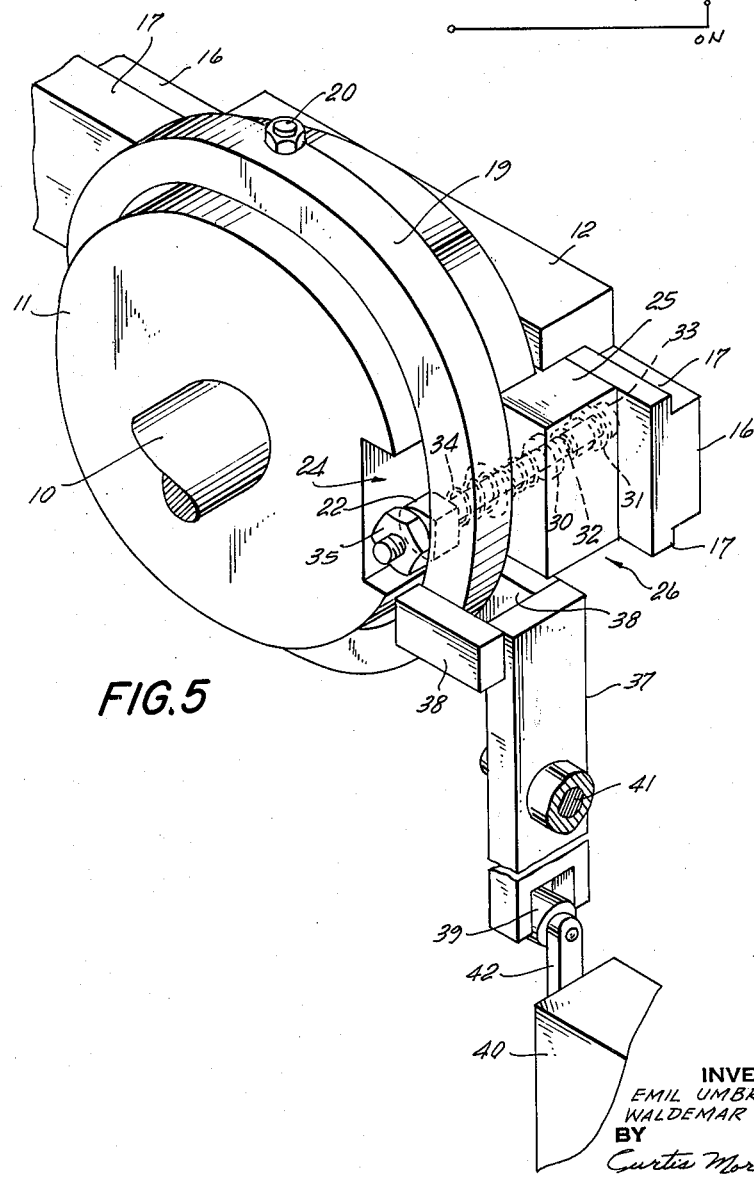
INVENTOR
EMIL UMBRICHT
WALDEMAR F. HACKETHAL
BY
Curtis Morris & Safford
ATTORNEYS United States Patent Office 3,214,669
Patented Oct. 26, 1965

3,214,669
OVERLOAD SHUT-OFF DEVICE
Waldemar F. Hackethal, Plymouth, and Emil Umbricht, Northville, Mich., assignors to Ajem Laboratories, Livonia, Mich.
Filed Mar. 20, 1962, Ser. No. 181,094
5 Claims. (Cl. 318—475)

Our invention relates to overload shut-off devices and more particularly to overload shut-off devices for machines having crankshafts or crank arms. More particularly the invention relates to transfer devices of the walking beam type.

This invention is particularly adaptable as an improvement to the apparatus and method of the copending allowed continuation-in-part application, Serial No. 375,175, filed May 26, 1964 by co-inventor, Emil Umbricht.

In machines having crankshafts and crank arms, there has been need for a device which will almost instantaneously shut off the activating mechanism should an overload occur. This is especially critical during the two positions when the crank arm and a link, or "connecting rod," actuated thereby are in substantial alignment, i.e., on or close to "dead center." At that time, the mechanical advantage is almost infinite, and if force is applied along the connecting rod while the rotation is stopped, the force cannot be absorbed in movement of the crank, and serious damage to the mechanism may result. Additionally, if force is applied to continue rotation of the crank at these points while the mechanism which it drives is blocked or overloaded, then, because of the almost infinite mechanical advantage, breakage is likely to result. Even if the drive mechanism is protected by an overload device, it most probably will not function until after damage has already occurred to the driven mechanism, because of the very high mechanical advantages at these points.

It is, therefore, an object of our invention to provide a device for a machine having a crankshaft and a crank which will instantaneously relieve such applied forces and shut off the machine if a serious overload occurs.

Another object of our invention is to accurately predetermine the point at which release occurs in response to overload.

Another object of our invention is to provide versatility to meet various conditions of operation.

A further object of our invention is to provide an overload shut-off device which is simple in construction, rugged, and precise.

In this specification and the accompanying drawings we have shown and described a preferred embodiment of the invention and certain modifications and alternatives; it will be understood, however, that these are given for purposes of illustration in order that others skilled in this art may more fully understand the invention and the principles thereof and its application to practical use so that they can modify it and adapt it in various forms, each as may be best suited to the conditions of the particular use.

In the accompanying drawings:

FIGURE 1 is a top plan view of a device embodying the invention, but partly in horizontal section to expose the shear pin and compression spring;

FIGURE 2 is a fragmentary side elevation of the device and partly broken away, as viewed from the bottom of FIGURE 1;

FIGURE 3 is a view, partly in section and partly in elevation taken on line 3—3 of FIGURE 2 in the direction of the arrows in FIGURE 2, showing the limit switch, feeler device and supporting structure;

FIGURE 4 is a simplified elevation, including an electrical diagram, showing the device embodying the present invention as it would appear with the shear pin severed, and;

FIGURE 5 is a perspective of the device in FIGURE 1 viewed from the upper left thereof.

With reference to FIGURES 1 and 2 of the drawings, the illustrated preferred embodiment of this invention includes a driveshaft 10 and a plate 11 fixedly connected thereto to rotate therewith. The plate is of considerable thickness to give mechanical strength for functioning as described below.

Referring now to FIGURE 2, two substantially parallel guide rails 12 are mounted on the outside face of the plate 11 substantially equidistant from the center line of the shaft 10 and with their fixing sides flush with the sides of a diametric groove 13 in the face of plate 11, thus forming a channel between them and the groove, for transmission of torque and for directing sliding of the crank arm 16 as hereinafter described, if and when the shear pin 33 breaks.

Guides 12 are stepped, grooved or undercut, leaving flanges 14 which engage the crank arm 16, and hold it bottomed in the groove 13. The crank pin 15 (broken away in FIGURE 2) is carried by the crank arm 16. The longitudinal outer corners of crank arm 16 are notched at 17 and these lengthwise notches receive flanged rails 14 and thus hold crank arm 16 except for longitudinally sliding along the rails.

A rotational torque is transmitted from the plate 11 to crank arm 16 directly by virtue of the groove 13 in which the crank arm fits. A connecting rod 18, through pin 15, links crank arm 16 to a machine such as a walking beam mechanism of the type described in the aforementioned copending application of Emil Umbricht.

Referring back to FIGURES 1 and 2, a ring 19 surrounds plate 11 with a narrow clearance between to allow for swinging of the ring on an axis through the plate 11 and normal to the axis of rotation of shaft 10. The ring 19 is connected to the wheel 11 by pivot screws 20. As shown in the left hand portion of FIGURE 1, ring 19 has a tab 22 extending from its inner circumference. Tab 22 has a hole 23 drilled therethrough.

Wheel 11 has a notch 24 in the vicinity of tab 22. A boss 25, welded into this notch 24, extends beyond the front face of wheel 11 (bottom face as viewed in FIGURE 1).

Crank arm 16 has a notch 26 at its end adapted to receive a projecting portion of boss 25. Aligned countersunk holes 28 and 29 are provided in crank arm 16 and boss 25, respectively. Flanged bushings 30 and 31 are mounted in these holes 28 and 29.

Bolt 3 passes through holes 28, 29 and 23, and interconnects the parts 11, 16 and 19. The bolt 33 is weakened by grooves 32, so it serves as a shear pin and is made of a material and size to accurately predetermine the overload release torque at which it will shear. Other types of breakable elements may be used in the drive as equivalents of such a shear pin, as is well understood in the art of machine design.

Compression spring 34 is compressed between bushing 31 and tab 22 of ring 19, and a nut 35 is screwed onto the end of bolt 33 to secure the ring 19 aligned with wheel 11 and against swinging out of alignment on the pivots 20. Notch 26 in crank arm 16 leaves a space 36 between the boss 25 and the end of the notch 26 sufficient to accommodate the shear distortion necessary to break shear pin 33 when it is overloaded. Boss 25 serves to support the shank of the shear pin 33 and thereby fixes crank 16 to wheel 11 by preventing the pin 33 from wobbling. Boss 25 also serves as a seat for compression spring 34.

At the left hand end of FIGURE 2, a forked lever 37 is positioned with its tines 38 engaging the edge of ring 19 between them.

Lever 37 is pivotally mounted at 41 with the pivot axis substantially in the plane of the ring 19.

An electrical limit switch 40 is engaged by the lower end of lever 37. To this end a roller 39 on the arm of switch 40 is engaged by a slotted or forked end of the lever 37 as shown in FIGURES 2 and 3.

In operation, normal torque is transmitted by shear pin 33, but when overload occurs, shear pin 33 will break. Compression spring 34 will then push out tab 22, swinging ring 19 on its pivots 20 out of alignment with wheel 11 (see FIGURE 4 and, see also the dotted arrow at the right in FIGURE 1). Ring 19 will push against the feeler tines 38 on lever 37; thus swinging lever 37, and through it the arm 42 of limit switch 40, to turn off the electric motor 44, or other activating means. If the connecting rod 18 is positioned in substantial alignment with crank arm 16, the driving force may be irresistibly opposed. Space 36 then provides room for movement of crank arm 16 necessary to break shear pin 33.

Guides 12 and groove 13 provide a channel in which crank arm 16 is retained with freedom to slide back and forth if the shear pin breaks, thus preventing crank arm 16 and its connecting rod 18 from flying loose. Motor 44 has a power output shaft 45 (n.b. usually the motor also includes a gear reducer). Output shaft 45 and drive shaft 10 are connected by any means well known in the art, such as by a sprocket and chain drive, or, as illustrated in FIGURE 4, by a set of spur gears 46 and 47.

Thus a simple, rugged, and precise overload shut-off device has been provided with the ability to keep the crank arm 16 from damaging other parts or operators if an overload occurs.

What we claim is:

1. An overload shut-off device for a machine having a crank and link drive, comprising a crank mounted on the end of a driveshaft and slidable transversely to the axis of rotation thereof, overload release means securing said crank relative to the end of said shaft against said transverse sliding and adapted to release said crank at a predetermined component of force acting transversely to said drive shaft along said crank, which force component is greater than any required for normal operation but less than would damage any part of the machine, and shut-off means adapted to react by cutting off power for driving said shaft upon crank by said release of said release means.

2. An overload shut-off device for a power-operated machine having a crank drive comprising a crank mounted on the end of a driveshaft and slidable substantially perpendicularly to the axis thereof, a ring connected to said shaft for swinging on an axis normal to the axis of rotation of said shaft, a shear pin fixedly holding said ring and said crank arm relative to each other, resilient means compressed against said ring, a lever having a projection extending therefrom across at least one face of said ring, and a shut-off switch positioned to react to any movement of said lever.

3. An overload shut-off device for a power-operated machine having a crank drive comprising a fixture connected along its axis to an end of said driveshaft to rotate therewith and having a transverse channel on the outside face thereof, a crank arm slidably mounted in said channel, a ring having an inner perimeter conforming to and larger than the outer perimeter of said fixture and pivotally connected thereto on an axis of swing perpendicular to the axis of rotation of said crank, overload release means securing said ring and said crank arm relative to each other and fixing the latter on said fixture but adapted to break by an abnormal force acting along said crank before said force can cause damage to other essential parts, bias means bearing on said ring and adapted to swing it out of alignment with said crank arm upon the breaking of said shear pin, and shut-off means positioned to react to swinging of said ring by cutting off power to said machines.

4. An overload shut-off device for a power-operated machine having a crank drive comprising a member at the end of said shaft secured to rotate therewith; two substantially parallel guides on the outside of the said member substantially equidistant from the centerline of said shaft; a crank arm slidably mounted along said guides; a ring surrounding said member and pivotally connected thereto on an axis of swing substantially perpendicular to the axis of rotation of said crank; a shear pin connecting said crank to said ring through aligned holes therein, said holes being spaced substantially from the swing axis of said ring; a shear pin shank support boss mounted on aid drum and aligned between said holes to connect said crank to said member by means of said shear pin passing therethrough, bias means bearing against said ring and contained by said shear pin so as to align said ring with said member in a plane perpendicular to the axis of rotation of said crank; a limit switch having an arm mounted and positioned to engage said ring and adapted to cut off power for said machine upon swinging of said ring.

5. A device as described in claim 4 wherein said bias means is a compression spring, said member is substantially drum shaped, and said limit switch arm has two fingers to respectively engage either side of said ring, whereby a breaking of the shear pin frees the ring to swing out of alignment with said drum member by action of said compression spring thereby engaging said limit switch arm and tripping the limit switch shutting off the machine.

References Cited by the Examiner

UNITED STATES PATENTS

| | | | |
|---|---|---|---|
| 2,022,007 | 11/57 | Moore | 318—475 |
| 2,037,260 | 4/36 | Nelson | 318—475 X |
| 2,062,905 | 12/36 | Hilty et al. | 318—475 X |
| 2,147,220 | 2/39 | Steinhour | 200—52 |
| 2,260,769 | 10/41 | Bonham | 200—52 |
| 2,628,337 | 2/53 | Getz | 318—475 |
| 2,647,965 | 8/53 | Michie | 318—475 X |
| 2,721,301 | 10/55 | Unk | 318—475 |

ORIS L. RADER, *Primary Examiner.*